United States Patent Office.

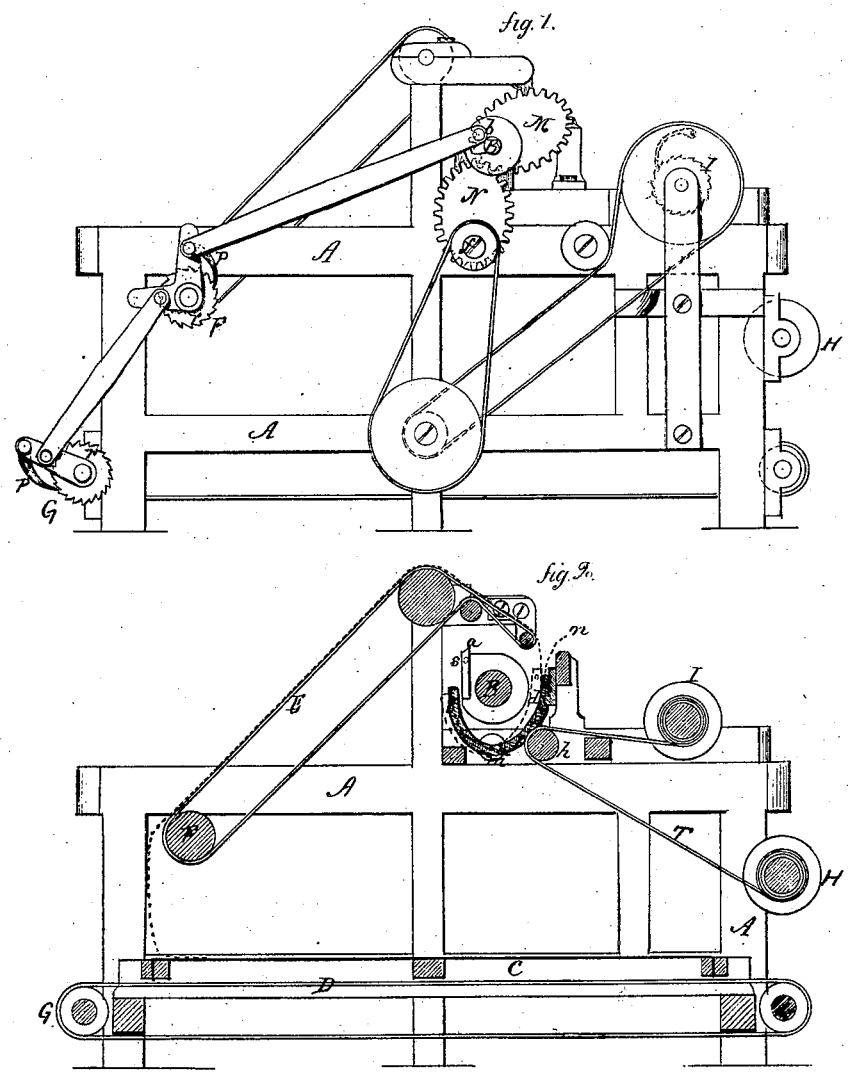

CHARLES A. ENSIGN, OF NAUGATUCK, CONNECTICUT.

Letters Patent No. 109,725, dated November 29, 1870.

---

IMPROVEMENT IN MACHINES FOR CUTTING SHEETS OF INDIA RUBBER.

The Schedule referred to in these Letters Patent and making part of the same.

---

*To all whom it may concern:*

Be it known that I, CHARLES A. ENSIGN, of Naugatuck, in the county of New Haven and State of Connecticut, have invented a new Improvement in Machine for Cutting Sheets of India-Rubber Gum; and I do hereby declare the following, when taken in connection with the accompanying drawing and the letters of reference marked thereon, to be a full, clear, and exact description of the same, and which said drawing constitutes part of this specification, and represents in—

Figure 1 a side view, and in

Figure 2 a longitudinal central section.

This invention relates to the construction of a machine for cutting sheets of India-rubber gum (while in a plastic state, or before vulcanization) into strips, to be used in the manufacture of various articles, but chiefly over-shoes.

In many branches of manufacture of India-rubber goods it is necessary to use strips of gum while in a plastic state. To cut the strips and handle them after they are cut has been a source of considerable difficulty in this class of manufacture, which, by my invention, is entirely overcome; and It consists—

First, in the arrangement of a rotary cutter combined with a fixed cutter, and a feeding mechanism, to present the sheet of gum to the fixed cutter so that the revolving cutter will separate a portion of the gum when the said revolving cutter comes in contact with the fixed cutter.

Second, in combination with the fixed cutter, a device for receiving the portions cut from the sheet and taking them away, in such manner as to prevent the wrinkling of the strip or portion cut.

A is the frame of the machine which supports the operative mechanism.

B is the driving-shaft, to which power is applied, and upon which said shaft is arranged a cutter, *a*, so as to revolve with the said shaft.

*d* is a fixed cutter, in such relative position to the revolving cutter *a* that the two combined (that is, the cutters *a* passing the fixed cutter) form a shear, to separate the gum placed between the two.

C is a table, arranged upon an endless band, D. Upon the said table a sheet of gum is placed, the said table receiving the gum from the apparatus constructed to work the gum into sheets.

From this table the sheet is passed over an endless band, E, as denoted in broken lines, down past the cutter *d*.

The endless band E is operated by a drum, F, and the endless band D by a drum, G, and an intermittent movement given to the said drums from a crank, *b*, on the driving-shaft, communicating with ratchets *r* on the said drums by pawls *p*, as seen in fig. 1, so that, at each revolution of the driving-shaft, the endless bands D and E are advanced a certain given distance, and this distance defines the length to be cut from the sheet. Therefore, as the material is fed down past the cutter *d*, as denoted in broken lines, the revolving cutter, as it meets the fixed cutter, cuts off so much of the sheet as has been fed, in the manner before described.

After one cut has been made, to free the sheet from the fixed cutter I arrange a lever, L, upon a fulcrum, *m*, upon one arm of which is arranged a rod, *n*, (see fig. 2,) which lies back of the sheet over the fixed cutter; and upon the cutter (or one end of the cutter-cylinder) I arrange a stud, *s*, denoted in broken lines, fig. 2, so that, as the cutter *a* revolves, the said stud will strike the other arm, *t*, of the lever L, and throw the rod *n* forward to force the gum from the fixed cutter, to which it may have adhered, and thus prevent the interruption of the feed.

Owing to the nature of the material, the strip when cut, unless prevented, would fall in a folded mass, from which it would be difficult to return it to its original condition.

To avoid this, and for convenience of handling, I arrange a drum, H, upon which has been wound a sheet, T, of fabric, at least as wide as the sheet of gum; and the end of this sheet I pass around a drum, *h*, immediately below the fixed cutter, as seen in fig. 2, to the drum I, so that, by the turning of the drum I the sheet will be wound from the drum H.

Onto this sheet the strip cut from the gum falls; and, in order that it may lie flat and smooth upon this sheet, I impart to the drum I a quick movement at the time of cutting—so quick that the end of the strip cut, striking the moving sheet, is advanced faster than the strip falls, consequently the strip lies back flat upon the said moving sheet; and this quick movement I produce by eccentric gears, *m* and *n*; the one, *m*, fixed to the driving-shaft, and the other to an intermediate shaft, *f*. (See fig. 1.)

From the shaft *f* power is communicated to the drum I by bands, as denoted in fig. 1, the quick motion of the shaft *f* occurring at the instant the strip is cut from the sheet of gum.

The strips fall successively upon the sheet, (the said sheet having been previously prepared to prevent their adhering thereto,) and are wound with the sheet onto the drum I; and when the sheet has been entirely taken from the drum H, the drum I is removed for the workman to take therefrom the strips as required, and a new drum supplied.

The table C is also replenished with gum as often as the quantity thereon is consumed.

I claim as my invention—

1. The revolving cutter $a$ and fixed cutter $d$, combined with the moving table C and endless band E so as to present the gum to the said cutters in the manner described.

2. In combination with the revolving cutter $a$, fixed cutter $d$, and a device for feeding the gum thereto, the arrangement of the sheet T, to receive the said gum when cut, and operating in the manner described.

3. In combination with the revolving cutter $a$, fixed cutter $d$, and a device for feeding the gum thereto, the lever L, carrying the rod $n$, so as to disengage the sheet of gum from the fixed cutter, substantially as set forth.

CHAS. A. ENSIGN.

Witnesses:
J. H. SHUMWAY,
A. J. TIBBITS.